United States Patent
Stocchiero et al.

(10) Patent No.: US 7,008,530 B2
(45) Date of Patent: Mar. 7, 2006

(54) WATER SOFTENER

(75) Inventors: Franco Stocchiero, Montorso Vicentino (IT); Giuseppe Fontana, Tradate (IT)

(73) Assignee: ATI Applicazioni Technologie ad Iniezione SpA, Montorso Vicentino (IT)

( * ) Notice: Subject to any disclaimer, the term of this patent is extended or adjusted under 35 U.S.C. 154(b) by 55 days.

(21) Appl. No.: 10/318,403

(22) Filed: Dec. 13, 2002

(65) Prior Publication Data
US 2003/0188999 A1  Oct. 9, 2003

(30) Foreign Application Priority Data
Dec. 21, 2001  (IT)  .......................... VI2001A0266

(51) Int. Cl.
*B01J 49/00* (2006.01)
*C02F 1/42* (2006.01)
(52) U.S. Cl. ..................................... 210/143; 210/191
(58) Field of Classification Search ................ 210/687, 210/143, 190, 191, 278, 288; 137/599.15, 137/625.29
See application file for complete search history.

(56) References Cited

U.S. PATENT DOCUMENTS

| 2,902,155 | A | * | 9/1959 | Lundeen | 210/105 |
| 3,307,581 | A |   | 3/1967 | Rudelick | 137/625.29 |
| 3,509,998 | A | * | 5/1970 | Pellett et al. | 210/98 |
| 3,867,961 | A |   | 2/1975 | Rudelick | 137/625.29 |
| 5,045,187 | A | * | 9/1991 | Suchanek | 210/91 |

* cited by examiner

*Primary Examiner*—Ivars C. Cintins
(74) *Attorney, Agent, or Firm*—Dykema Gossett PLLC

(57) ABSTRACT

A water softener employs a vessel, a distributor with a manifold body associated to said vessel and a valve control device. A control unit programs operation of the softener. An actuator unit has a cylinder divided into a first chamber and a second chamber. The actuator unit is adapted to move a spool to define different flow ways, for water. The first chamber communicates directly with a water inlet pipe, and the second chamber communicates with the inlet pipe through a valve and an outlet.

17 Claims, 8 Drawing Sheets

ACTIVE CYCLE STAGE

REGENERATION STAGE

REGENERATION STAGE

FIG.5 — WASHING STAGE

VENTURI NOZZLE

REGENERATION STAGE

WATER SOFTENER

BACKGROUND OF THE INVENTION

The present invention relates to a water softener, particularly adapted to be installed upstream the home distribution network.

It is well known that the percentage of calcium in the water supplied by the public distribution network, is variable from one place to another and sometimes with time, but such a percentage is generally higher than the optimal quantity required by the human body.

It also known that an excessive quantity of calcium like an excessive deficiency, may cause troubles for the health of the users, but also for the hydraulic devices through which calcium rich water is flowing. More particularly an excessive quantity of calcium dissolved in water causes deposit of lime layers inside the pipes and in the long run said scaling cause pipe clogging and decrease of performances of said devices, sometimes requiring replacement of the corresponding element or the entire device.

In order to remove these drawbacks water undergoes a softening treatment generally consisting in filtering water with special softening substances such as ionic resins blocking the calcium ion.

More particularly said ion exchanging resins convert calcium and magnesium salts, tending to be deposited with water heating, into sodium salts that on the contrary remain in solution.

Indeed, when the cationic resins are strong in sodium cycle, this free base is sodium saturated; said resins by natural affinity, when crossed by hard water, capture the calcium ion and release the sodium ion generating said exchange phenomenon that can be considered as instantaneous.

In such a process the resins release sodium up to its exhaustion, gradually losing their filtering feature. In this situation the resins must undergo a regeneration treatment by which they are supplied again with sodium, substantially undergoing the opposite process now described.

According to the prior art, regeneration generally consists firstly in dissolving the captured calcium through a solution generally comprising sodium chloride dissolved in water, and then removing calcium washing the regenerated resin.

In order to carry out such a treatment special softeners are used, installed upstream the distribution circuit of water to be treated and allow to control the level of water hardness.

The known softeners generally comprise a vessel containing the ionic resin associated with a distributor comprising a manifold body in which there is an inlet pipe for water to be treated and an outlet pipe for treated water.

Inside the manifold body there is a plurality of inner ducts that can be intercepted through flow ways belonging to a spool sliding inside said manifold body and moved by an actuator unit.

More particularly the actuator unit moves the spool to define different mutual positions between the flow ways and the inner ducts, each position being adapted to define different water paths.

The different spool positions therefore define the different operative stages of the device, comprising as above stated, a working or processing stage in which water is being filtered and delivered to the outlet duct, a regeneration stage of the ionic resin and a washing stage of said resin.

SUMMARY OF THE INVENTION

According to a first known embodiment, the actuator is hydraulic and consists of a cylinder fixed to the spool and sliding in a barrel whose volume is divided into a first and a second chamber opposite to each other. Each chamber has a feeding way of pressurized liquid and a discharge way each provided with corresponding valves.

The movement of the cylinder corresponding to said stages is obtained by causing the pressurized liquid to enter alternatively the first and the second pressurized chamber by opening and closing the feeding and discharge valves.

In this way, indeed, pressure of liquid acting on the cylinder surfaces is causing movement of the spool in either direction.

A first drawback of the described prior art consists in that four control valves are required for operation of the spool, each valve being adapted to open or close the liquid feeding or discharge ways in each pressurized chamber.

A further drawback consists in that said valves are not very reliable.

Another drawback is that a high number of feeding and discharge valves increases considerably the likelihood of device failure.

The object of the present invention is to provide a water softener overcoming said drawbacks and limitations.

More particularly a first object of the invention is to provide a softener that is more reliable than the prior art softeners of equivalent features, conditions and characteristics being equal.

Another object is to provide a device that is cheaper and stronger, the performances being equal.

A further object of the invention is to provide a softener reducing to the minimum the amount of valves required for its operation.

A last but not least object is to provide a softener having an actuator unit which is simpler and more reliable relative to the known actuator units.

Said objects are attained by a water softener that according to the main claim comprises:

at least a vessel containing a softening substance;

at least a distributor consisting of a manifold body associated to said vessel in which there is at least an inlet pipe for water to be treated, at least an outlet pipe for treated water and a plurality of inner ducts to be intercepted through flow ways belonging to a spool sliding inside said manifold body;

at least a control device comprising mechanical members adapted to control opening and closing of valves during the various stages of operation of said device;

a control unit for programming and executing the operation cycles of said control device;

at least an actuator unit comprising a cylinder fixed to said spool and sliding in a barrel whose volume is divided into at least a first and a second opposite chambers, said actuator unit being adapted to move said spool to define different mutual positions of said flow ways relative to said inner ducts, each position being adapted to define different paths for said water;

said softener being characterized in that said first chamber is provided with at least a way directly communicating with said inlet duct and said second chamber has at least a first water feeding way communicating with the inlet pipe through a valve and at least a second seeping way for water outlet.

Advantageously the device of the invention has a double acting cylinder with a number of valves lower than the prior art devices of equivalent type.

Consequently the reduction of the number of valves required for operation of the device gives a greater reliability to said device.

Still advantageously with the device of the invention the mechanisms required for its operation are considerably reduced.

BRIEF DESCRIPTION OF THE INVENTION

The foregoing objects and advantages will be better understood by reading the following description of a preferred embodiment given as an illustrative and non-limiting example with reference to the accompanying sheets of drawings in which.

BRIEF DESCRIPTION OF THE INVENTION

Figure 1:
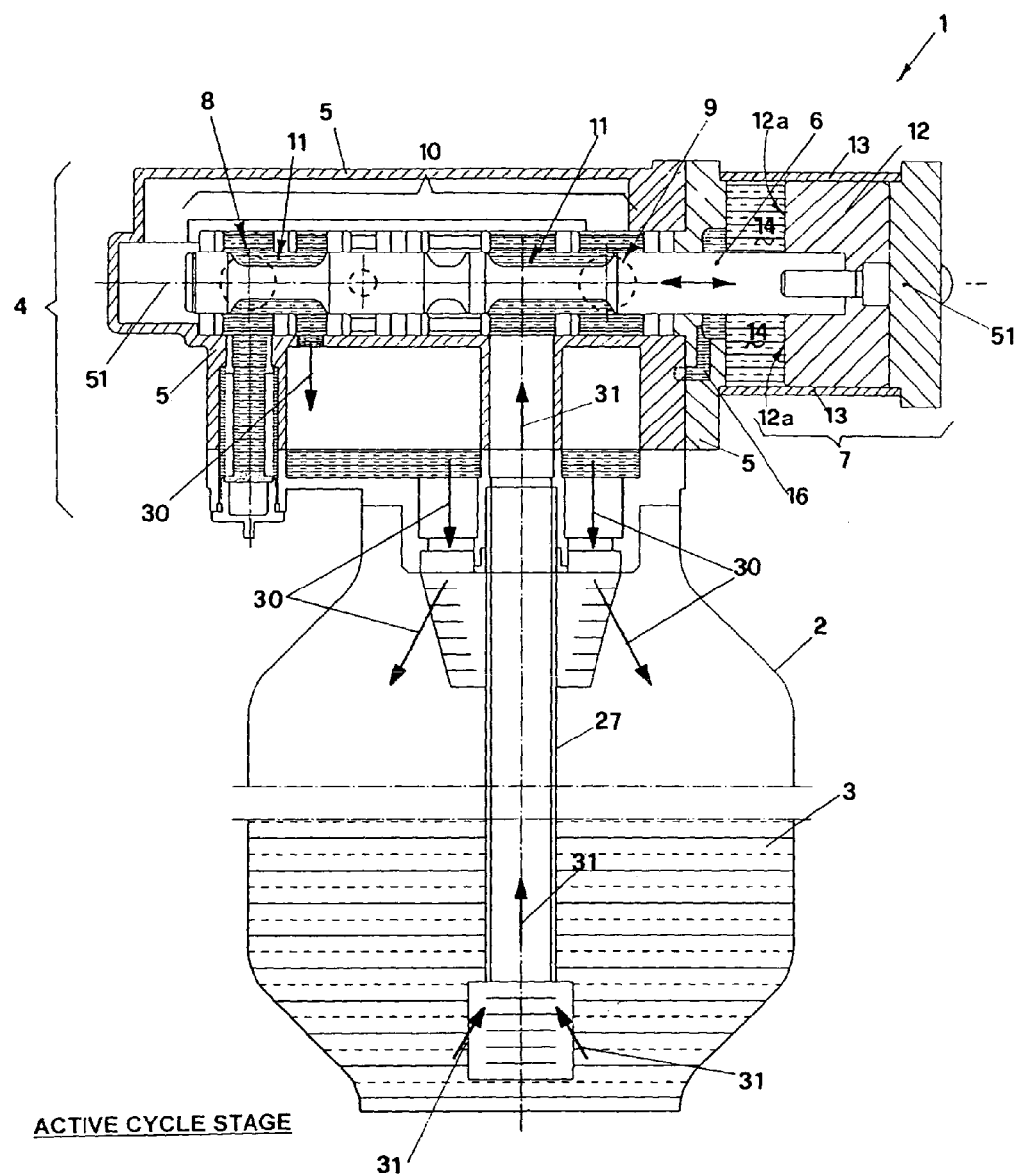
FIG. 1 is a cross sectional view of the device of the present invention in a first working configuration.
Figure 2:
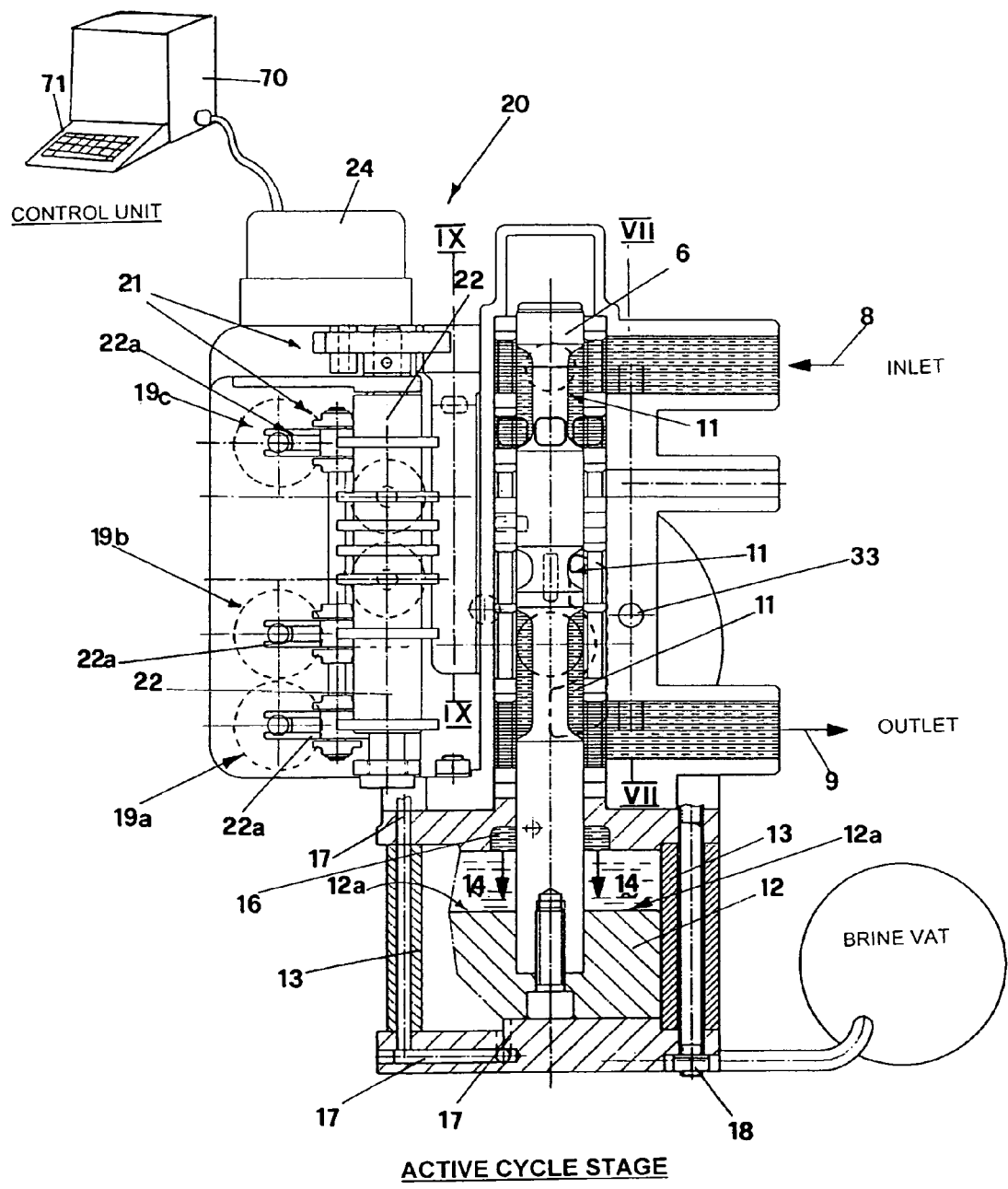
FIG. 2 is a sectional plan view of the device of FIG. 1.

The water softener of the present invention is shown in FIGS. 1 and 2 where is generally indicated with reference numeral 1; the device comprises a vessel 2 containing a softening substance 3 and a distributor 4 consisting of a manifold body 5 associated to vessel 2.

In the manifold body 5 there is an inlet pipe 8 for water to be treated, an outlet pipe 9 for treated water and a plurality of inner ducts generally indicated with numeral 10.

Said inner ducts 10 made on the manifold body 5, can be intercepted through flow ways 11 belonging to a spool 6.

The spool 6 is internally and slidingly coupled to the manifold body 5 and is moved along axis 51 by an actuator unit 7.

Figure 3:
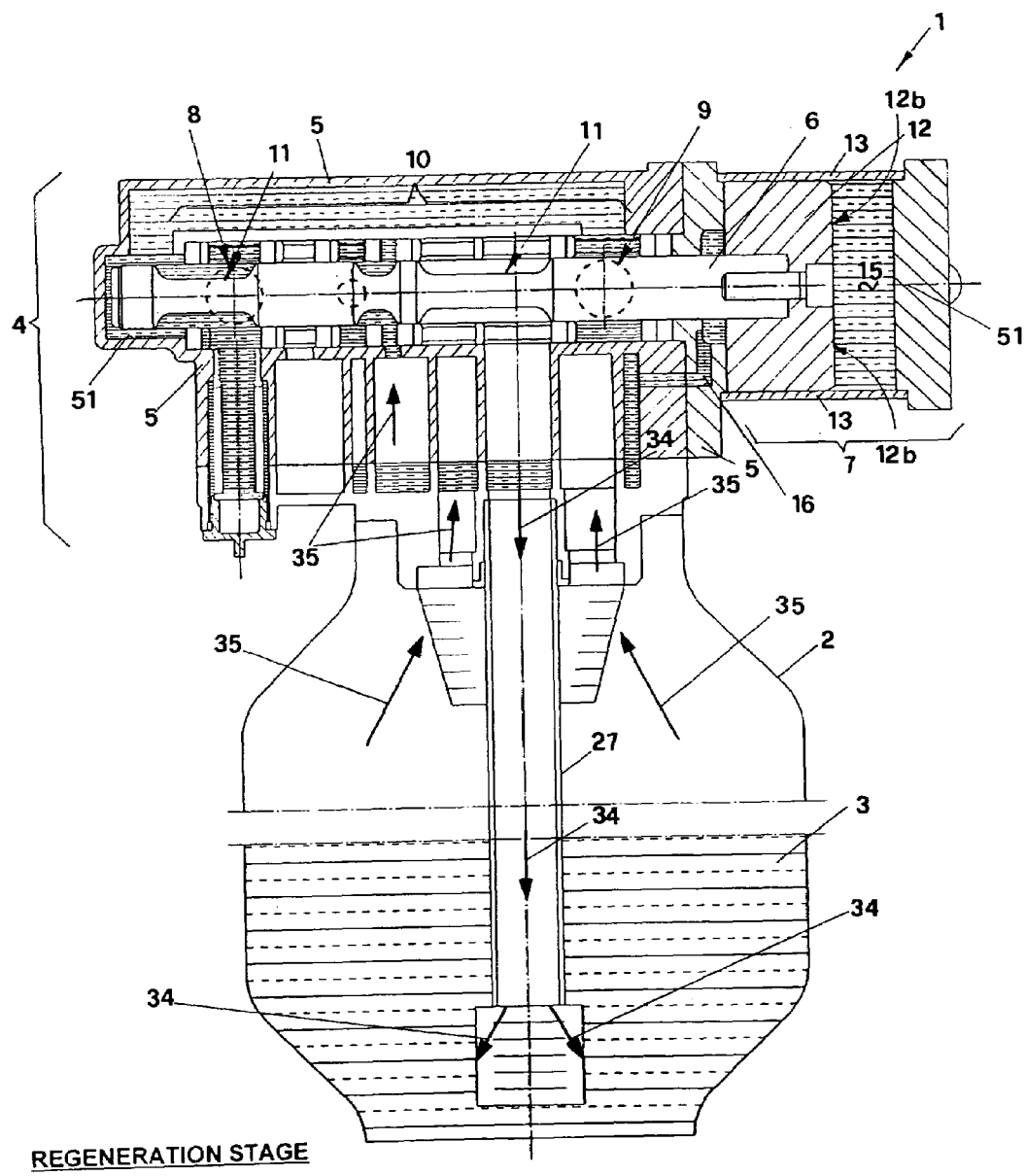
FIG. 3 is a cross sectional view of the device of FIG. 1 in a different working configuration.
Figure 4:
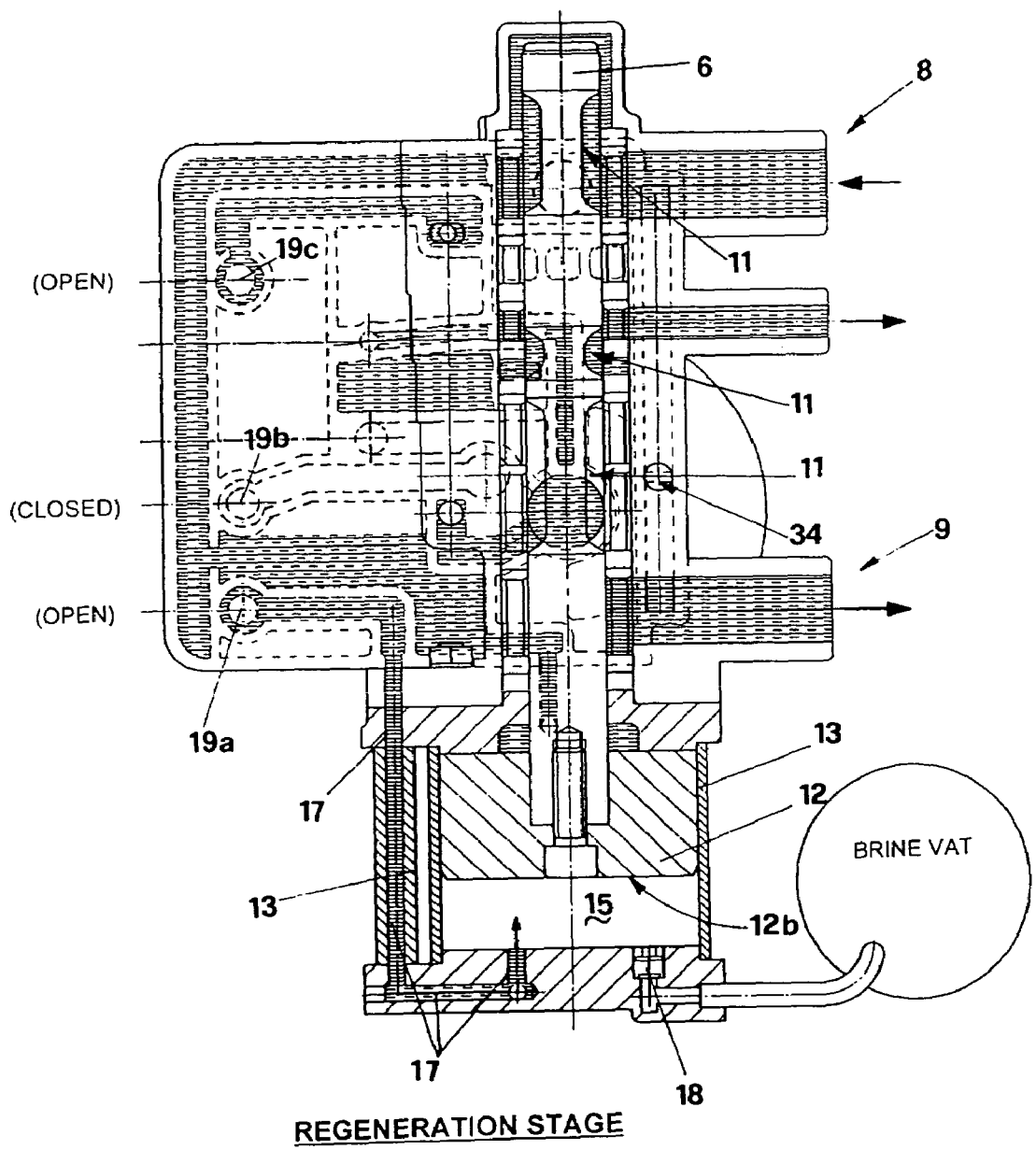
FIG. 4 is a sectional plan view of the device of FIG. 3.

More particularly the actuator unit 7 moves the spool 6 alternatively from a first position shown in FIGS. 1 and 2 to a second position shown in FIGS. 3 and 4.

To each position of spool 6 different mutual positions of the flow ways 11 relative to the inner ducts 10 are corresponding, thus carrying out different water paths.

It is to be particularly noted that the active paths are emphasized in the Figures of the drawings by the presence of liquid shown with hatch lines.

As to the actuator unit 7, it comprises a cylinder 12 fixed to the spool 6 and sliding inside a barrel 13.

The cylinder 12 divides the volume defined by the barrel 13 into a first chamber 14 to be seen in FIGS. 1 and 2 and a second chamber 15 opposite to the first chamber 14 and to be seen in FIGS. 3 and 4.

The invention provides that the first chamber 14 has a way 16 directly communicating with the inlet pipe 8, that is without interposition of valves opening and closing communication with the inlet pipe 8. Moreover, according to the invention the second chamber 15 has a first way 17 communicating with the inlet pipe 8 through valve 19a and a second seeping outlet way 18.

On the manifold body 5 there is also a plurality of control valves indicated with numerals 19a, 19b and 19c, adapted to regulate water flow inside the above mentioned different paths.

More particularly it is to be noted the control valve 19a intercepting the feeding way 17 of pressurized water for chamber 15.

Opening and closing of control valves 19a, 19b and 19c is obtained through a control device generally indicated with numeral 20, comprising mechanical members 21, motion mechanisms 24 and a control unit 70.

The mechanical members 21 comprise a cam shaft 22 causing opening or closing of valves 19a, 19b and 19c through levers 22a co-operating by contact with the stem of each said valve.

The cam shaft 22 is rotated by the motion mechanisms 24 generally consisting of an electric motor controlled by the control unit 70.

The control unit 70 comprises interface means preferably consisting of a keyboard 71 through which data are inputted that are then processed by processing means such as microprocessors, to control the movements of the spool 6 and rotation speed of cam shaft 22.

The rotation speed of the cam shaft 22 defines the opening and closing times of each valve 19a, 19b and 19c and consequently duration of the various working stages of the device.

Figure 5:
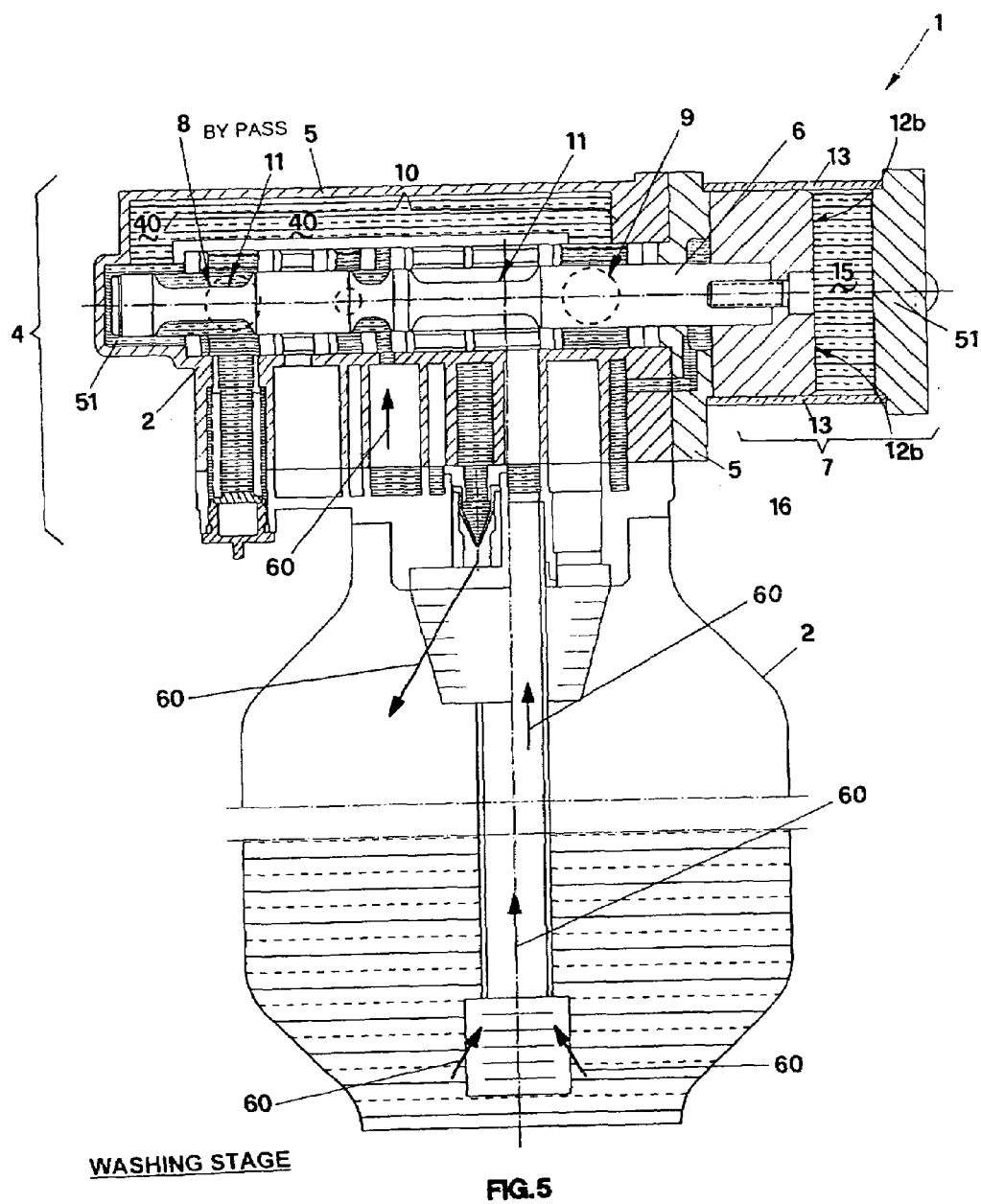
FIG. 5 is a cross sectional view of the device of FIG. 1 in another working configuration.
Figure 6:
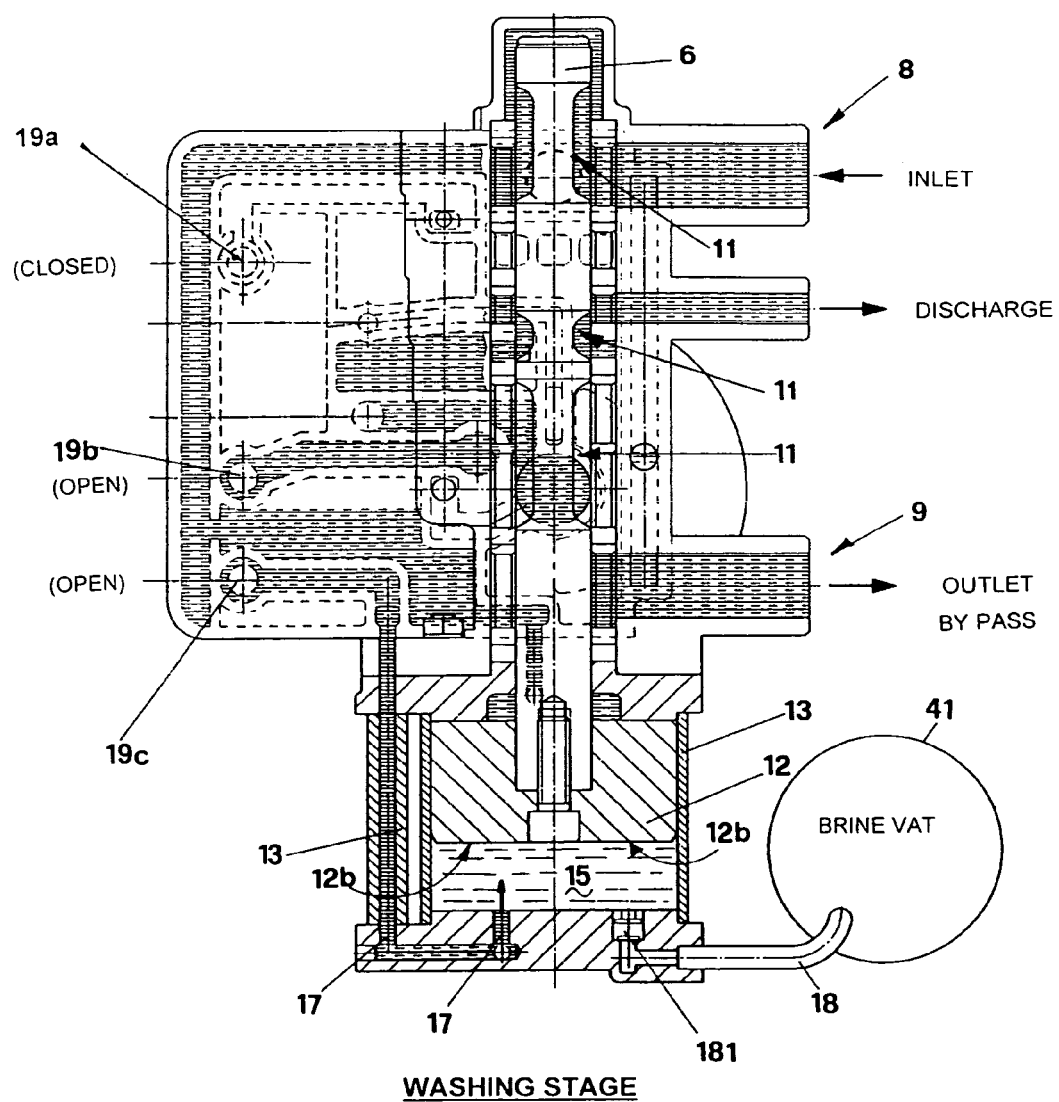
FIG. 6 is a sectional plan view of the device of FIG. 5.

More particularly as previously mentioned, said device generally provides for three different working stages:

a working or active cycle stage, shown in FIGS. 1 and 2 wherein valves 19a, 19b and 19c are all closed;

a resin regeneration stage shown in FIGS. 3 and 4 wherein valves 19a and 19c are open;

and a resin washing stage shown in FIGS. 5 and 6 wherein valves 19a and 19b are open.

Active Cycle Stage

In the active cycle stage the cam shaft 22 is stationary and the position of the spool 6 is shown in FIG. 2 such as water entering from the inlet pipe 8 is first conveyed inside the vessel 2 following the path indicated in FIG. 1 by arrow 30 and then to the outlet pipe 9 through pipe 27 following the path indicated by arrow 31.

Therefore water undergoes a treatment by the softening substance 3 consisting for example of ionic resins. In this stage valves 19a, 19b and 19c are closed.

In such a configuration the device provides also for the possibility of supplying to the outlet duct a variable percentage of untreated water so as to keep the contents of calcium in the outgoing water at least at the lower limit of the values requested by the regulations presently in force.

Figure 7:
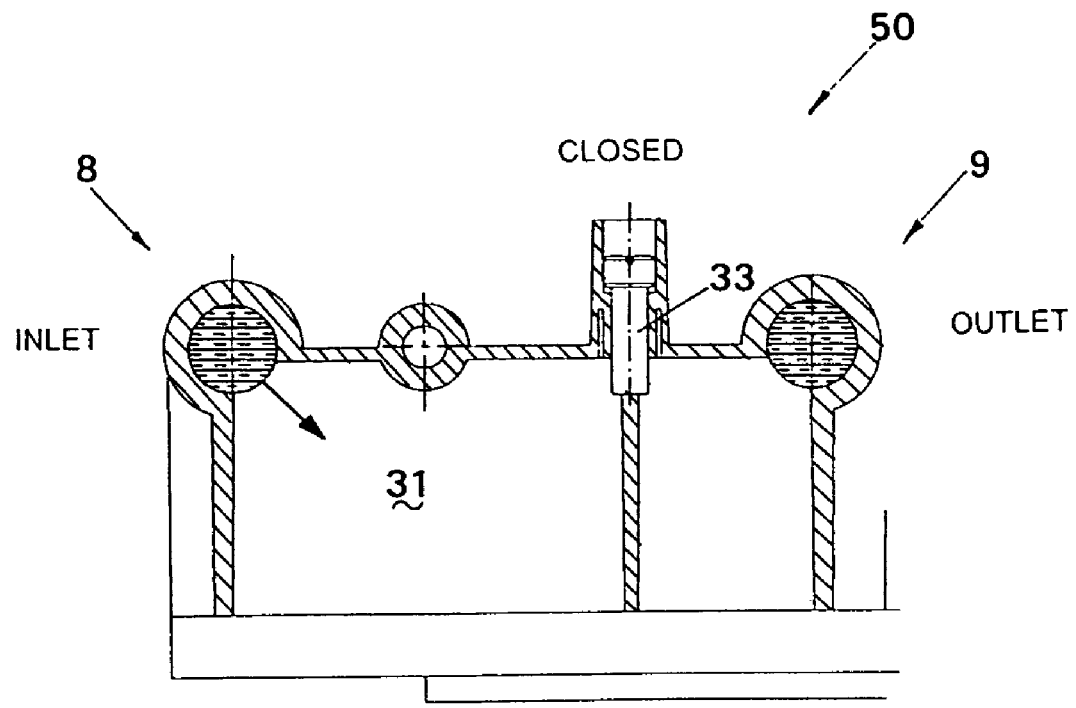
FIG. 7 is a sectional view taken along line VII—VII of a portion of the device of FIG. 2.
Figure 8:
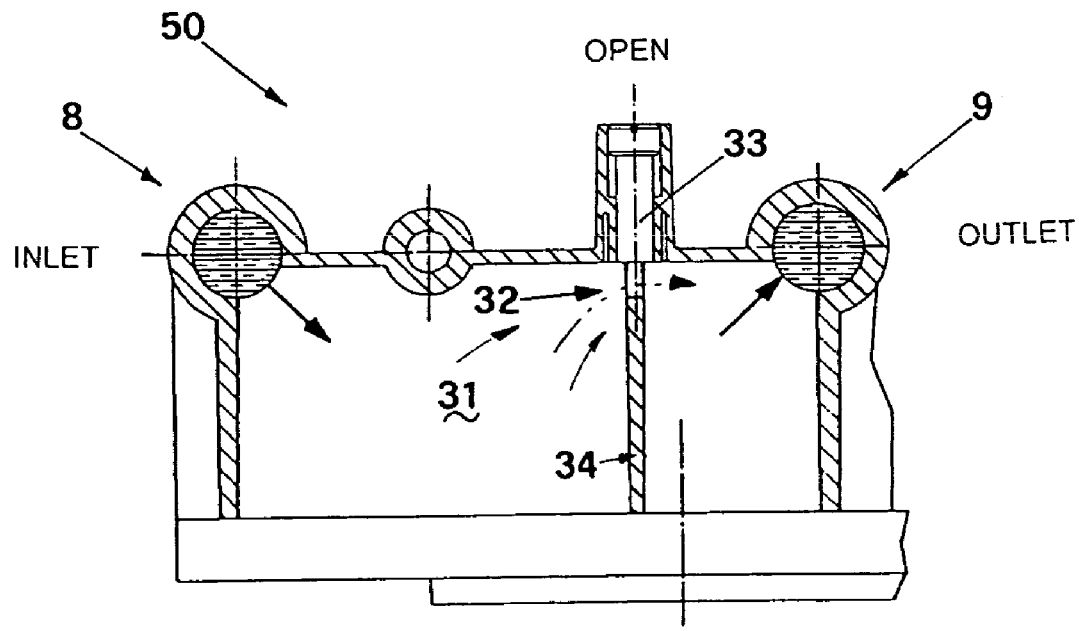
FIG. 8 is a sectional view of the portion of the device shown in FIG. 7 in another working configuration.

This is carried out through a control unit of the hardness of treated water, generally indicated with numeral 50 in FIGS. 7 and 8. Such a unit generally consists of a duct 31 connecting the inlet 8 to the outlet 9 through the slit 32 uncovered by screw 33 inserted into a seat vertically arranged in a stationary gate 34.

When the softener lowers the contents of calcium in the treated water below the limits allowed by law, the direct flow of a limited quantity of water coming from the inlet 8 through opening 32, allows addition of non-softened water, that is untreated water to that coming out from pipe 9, so as to balance again the calcium contents.

Regeneration Stage

When the softener goes to the regeneration stage, the cam shaft 22 rotates until valves 19a and 19c are opened. Opening of valve 19a allows to convey water present at inlet 8 to the second chamber 15. Filling of this chamber 15 and the consequent emptying of the opposite chamber 14 is made easier by the fact that surface 12b of cylinder 12 facing the chamber 15, is greater that surface 12a of the cylinder facing the opposite chamber 14, since the area of the surface 12a is reduced relative to surface 12b by the surface of the spool 6 in contact with the cylinder 12.

This has the consequence of an unbalance of the opposite forces acting on cylinder 12, generated by pressure existing inside the chambers 14, 15.

This unbalance causes the spool 6 to move until it reaches the stable position shown in FIGS. 3 and 4.

In this condition pressure in both chambers 14 and 15 is the same and equal to the pressure of water existing at inlet 8 of the device.

At the same time the inlet pipe 8 is put in direct communication with the outlet pipe through the by-passed duct 40 that can be seen in detail in FIGS. 3 and 4 so as to keep the hydraulic circuit downstream the device fed event during the regeneration stage.

Figure 9:
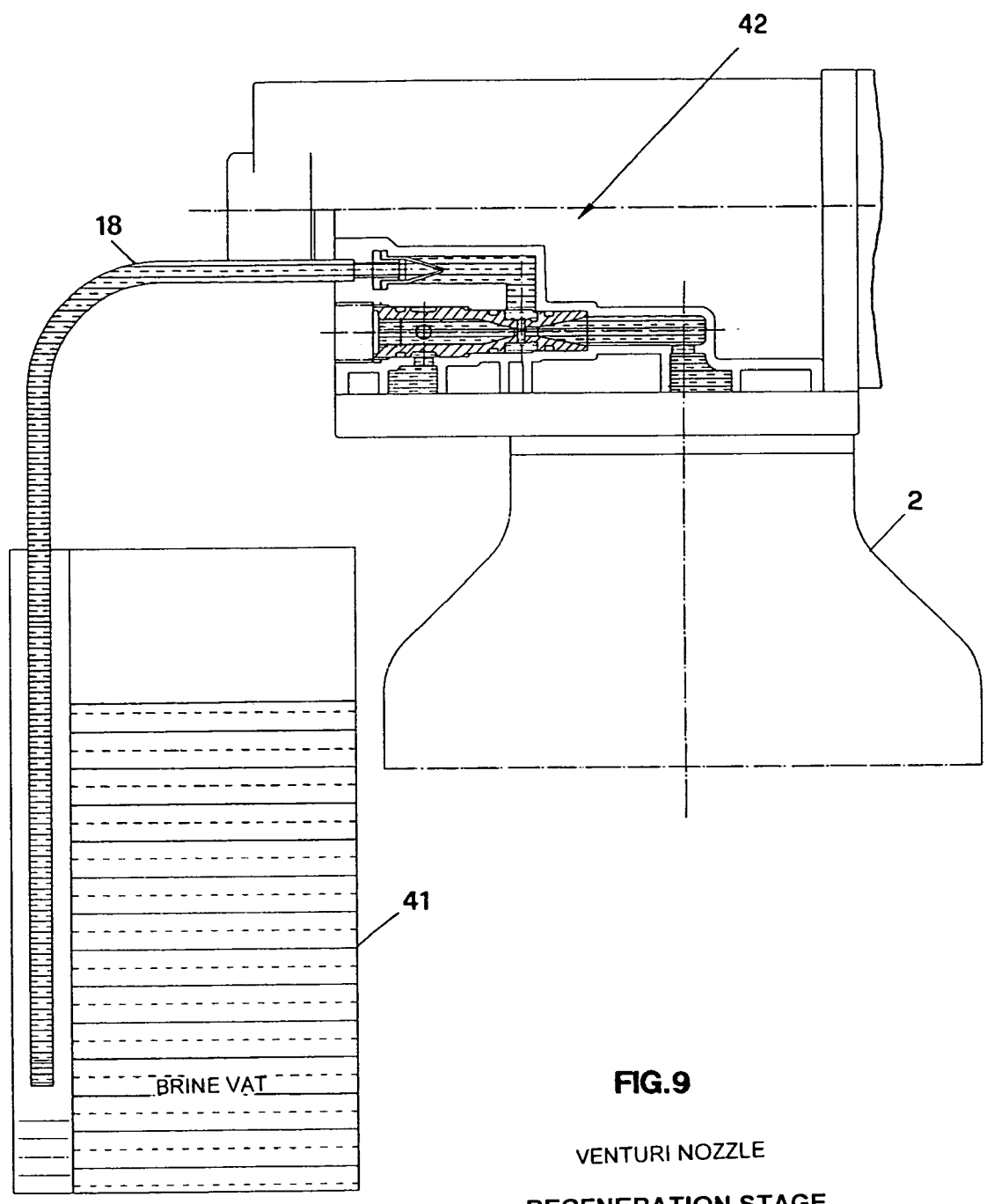
FIG. 9 is a longitudinal sectional view taken along line IX—IX of a further element of the device of FIG. 1.

In order to carry out regeneration of the resin, the control unit puts in communication by opening a first auxiliary duct, the ionic resin with a regenerating fluid generally consisting of a saline solution contained in a second tank 41 called brine vat, that can be seen in FIG. 6 and shown in detail in FIG. 9.

The regenerating fluid enters vessel 2 through pipe 27 along direction 34 and than flows upwards in vessel 2 according to the direction indicated by arrows 35 in FIG. 3, thus enhancing advantageously the process.

Withdrawal of the saline solution contained in tank 41 occurs through a known system using a venturi nozzle generally indicated with numeral 42 and shown in FIG. 9.

Washing Stage

When regeneration is completed, the control unit closes valve 19c and actuates the control valve 19b opening a second auxiliary pipe hydraulically connected to the inlet pipe 8 so as to create a water flow washing the resin 3 fully removing calcium dissolved in the saline solution.

In this case water flows in a direction opposite to the preceding one, namely downwards as indicated with numeral 60 in FIG. 5 so as to pack advantageously the ionic resins.

When washing is completed the control unit closes again valves 19a and 19b returning the spool to the starting position.

Closure of the control valve 19a causes a predominance of the force acting in the direction opposite to the preceding one. Water present in the second chamber 15 is evacuated through the second seeping way 18 thus allowing movement of cylinder 12.

It is also to be noted that on the seeping way 18 there is an adjustable flow reducer 181 acting as valve of the second tank 41. It is well known that the flow reducer allows to vary the pressure that the liquid must reach in the second chamber to cause its discharge through the second way 18.

Advantageously water coming out through the second seeping way 18 is conveyed to the second tank 41 so as to restore the level of liquid and prepare the saline solution required for the subsequent regeneration operation.

As to the spool 6, it is coupled to cylinder 12 through a central hole made on the cylinder 12 at the first surface 12a.

The installation of the device requires that it is hydraulically connected upstream the home water distribution circuit.

More particularly the inlet pipe 8 is hydraulically connected with the public water distribution network while the outlet pipe 9 is connected to the delivery duct of the home hydraulic circuit.

After connection of the device in the hydraulic circuit, the operator inputs through the keyboard 71 the configuration data relating to the calcium percentage wanted in the treated water, said data being processed by the control unit 70.

The device will then start to operate automatically supplying a water output with the inputted chemical characteristics.

It is also to be noted that through the keyboard 71 it is also possible to input the data relating to the regeneration conditions.

More particularly the device allows to input the regeneration stage at regular time intervals or as a function of the chemical characteristics of the produced softened water.

The device 1 is also provided with a disinfestation unit of a kind known per se that will not be described in detail.

It is also to be pointed out that the choice to have different areas of the surfaces 12a, 12b of the cylinder 12, allows to simplify the device control hydraulic circuit thus eliminating the control valves of the chambers 14 and 15 so as to decrease the cost of the device.

The simplification of the hydraulic circuit allows also to reduce the likelihood of device failure giving a greater reliability in comparison with devices using actuation systems of known type.

From the foregoing it is clear that the device of the present invention attains the above mentioned objects.

Although the invention was described with reference to the accompanying sheets of drawings, it may undergo modifications in the constructional stage, however still falling within the same inventive principle stated in the appended claims and therefore covered by the present patent.

What is claimed is:

1. A water softener comprising:
   a vessel for containing a softening substance;
   a distributor having a manifold body associated with said vessel, the manifold having an inlet pipe for water to be treated, an outlet pipe for treated water and a plurality of inner ducts, a spool having flow ways slidable in said manifold body, the flow ways selectively intersecting the inner ducts; and an actuator unit for operating the spool;
   a plurality of valves positioned in a valve body adjacent the spool, a control device positioned adjacent the manifold body including a motor and mechanical members adapted to control opening and closing of the valves during various operation stages of said softener;
   a control unit for programming execution of operative cycles of said softener;
   an actuator unit comprising a cylinder fixed to said spool and sliding in a barrel whose volume is divided into a first chamber portion and a second chamber portion opposite to said first chamber, said actuator unit being adapted to move said spool to define different mutual positions of said flow ways relative to said inner ducts, each position being adapted to set different water paths;
wherein
   said control unit comprises interface means and a processing unit for data inputted through said interface means, said data being adapted to set the opening and closing times of said valves, said water softener comprises a saline solution tank containing a fluid regenerating said softening substance and a seeping way connecting said distributor to said saline solution tank; and in wherein first chamber of said cylinder has at least one way directly communicating with said inlet pipe and said second chamber has at least a first water feeding way communicating with the inlet pipe through a valve and at least a second seeping way for water outlet.

2. The softener according to claim 1 wherein the area of the surface of said cylinder defining said first chamber is lower than the area of the surface of said cylinder defining said second chamber.

3. The softener according to claim 1 wherein said cylinder has an end formed with a central hole and the actuator unit is coupled to said spool through the central hole.

4. The softener according to claim 1 wherein in at least one of said positions of the spool, there is a direct communication between said inlet pipe and said outlet pipe.

5. The softener according to claim 1 wherein in at least one of said positions of said spool, said flow ways communicate with an interior of the vessel with a regenerating fluid of said softening substance.

6. The softener according to claim 1 including a control valve located between said first way and the inlet pipe.

7. The softener according to claim 1 wherein said mechanical members comprise a cam shaft moved by mechanisms.

8. The softener according to claim 7 wherein said mechanisms comprise en electric motor controlled by a control unit.

9. The softener according to claim 1 wherein said interface means comprises a keyboard.

10. The softener according to claim 1 wherein said processing unit comprises an electronic processing unit.

11. The softener according to claim 1 wherein said softening substance consists of ionic resin.

12. The softener according to claim 1 further comprising a second tank, and wherein said second seeping way has a flow reducer acting as a valve for said second tank.

13. The softener according to claim 1 wherein said opening and closing valves comprise three valves for opening and closing selectively in accordance with the operation stage of said cycle.

14. The softener according to claim 1 wherein the cylinder defining said first chamber portion has a first surface area, and the second chamber portion has a second surface area smaller than the first surface area.

15. The softener according to claim 1 wherein said actuator unit is coupled to said spool through a central hole formed in said first chamber portion.

16. The softener according to claim 1 wherein the inside of said vessel communicates with a regenerating fluid of said softening substance in at least one of said positions of said spool through said flow ways.

17. A water softener having operative cycles comprising:

a control unit for programming execution of operative cycles of the softener;

a vessel containing a water softening substance;

a distributor including a manifold body having an inlet pipe in communication with the vessel for carrying water to be treated thereto, an outlet pipe in communication with the vessel for carrying treated water therefrom, the manifold body has a plurality of inner ducts; a spool slideably mounted in the manifold body along an axis, said spool having an end and flow ways for intercepting selected ones of the inner ducts in accordance with the position of the spool in the manifold body; and an actuator for slideably operating the spool in the body;

a control device having a valve body mounted adjacent to end in flow communication with the manifold body including a plurality of valves and a cam shaft mounted on a cain shaft axis parallel to the spool axis, a plurality of cams carried by the cam shaft, each for engaging a corresponding valve; and a motor for driving the cam shaft;

an actuator unit comprising a cylinder coupled to the end of the spool, and being secured to the manifold body for sliding the spool between first and second positions, said actuator having a volume divided into a first chamber and a second chamber opposite to said first chamber, said actuator for moving the spool to define different positions of said flow ways relative to said inner ducts, each position being adapted to set different water paths for the softener; and wherein said control unit including a data processor and an interface coupled thereto for entering data in the processor for setting opening and closing times of said valves; and a saline solution tank for containing a fluid regenerating said softening substance, and a channel connecting said distributor to said saline solution tank;

and wherein the first chamber of said cylinder has a channel directly communicating with said inlet pipe and the second chamber has at least a first water feeding way communicating with the inlet pipe through one of said valves and a second channel for water outlet.

* * * * *